US008711386B2

(12) United States Patent
Johnson et al.

(10) Patent No.: US 8,711,386 B2
(45) Date of Patent: Apr. 29, 2014

(54) UTILIZING VIRTUALLY STORED MEDIA SNAPSHOTS FOR RASTERIZING PRINT JOBS

(75) Inventors: Charles D. Johnson, Boulder, CO (US); Kenneth S. Shouldice, Firestone, CO (US); David Ward, Broomfield, CO (US)

(73) Assignee: Ricoh Company, Ltd., Tokyo (JP)

( * ) Notice: Subject to any disclaimer, the term of this patent is extended or adjusted under 35 U.S.C. 154(b) by 212 days.

(21) Appl. No.: 13/406,260

(22) Filed: Feb. 27, 2012

(65) Prior Publication Data

US 2013/0222842 A1 Aug. 29, 2013

(51) Int. Cl.
*G06K 15/00* (2006.01)

(52) U.S. Cl.
USPC ......... 358/1.14; 358/504; 358/1.13; 358/1.15

(58) Field of Classification Search
CPC ............ G06K 15/186; G06K 15/1823; G06K 15/4065
USPC ........ 358/1.2, 1.9, 1.13, 1.18, 1.1, 1.14, 1.15, 358/1.16, 504
See application file for complete search history.

(56) References Cited

U.S. PATENT DOCUMENTS

| | | | | |
|---|---|---|---|---|
| 7,206,099 | B2 * | 4/2007 | Brewington et al. | 358/3.06 |
| 7,570,401 | B2 * | 8/2009 | Abad Peiro et al. | 358/504 |
| 8,031,369 | B2 * | 10/2011 | Ducato | 358/2.1 |
| 2002/0097408 | A1 * | 7/2002 | Chang et al. | 358/1.6 |
| 2002/0118380 | A1 * | 8/2002 | Krueger et al. | 358/1.9 |
| 2006/0126120 | A1 * | 6/2006 | Imafuku et al. | 358/1.18 |
| 2008/0055622 | A1 * | 3/2008 | Reuvers et al. | 358/1.13 |
| 2008/0180742 | A1 * | 7/2008 | Koike | 358/1.15 |
| 2010/0118336 | A1 * | 5/2010 | Oshima | 358/1.15 |
| 2011/0013210 | A1 * | 1/2011 | Yamaguchi | 358/1.9 |
| 2013/0250325 | A1 * | 9/2013 | Alimpich et al. | 358/1.13 |

* cited by examiner

*Primary Examiner* — Dennis Dicker
(74) *Attorney, Agent, or Firm* — Duft Bornsen & Fettig LLP

(57) ABSTRACT

Methods and systems herein provide for the use of virtually stored media "snapshots" for rasterizing print jobs. In one embodiment, a print controller receives a print job. The print controller identifies a virtually stored media that specifies a media property utilized for rasterizing the print job, where the virtually stored media is associated with a media tray of a printer. The print controller identifies the media property specified by the virtually stored media, and rasterizes the print job based on the media property specified by the virtually stored media.

15 Claims, 4 Drawing Sheets

UTILIZING VIRTUALLY STORED MEDIA SNAPSHOTS FOR RASTERIZING PRINT JOBS

FIELD OF THE INVENTION

The invention relates to the field of printing systems, and in particular, to rasterizing print jobs correctly in a manner that is independent from a particular media loaded at the printer.

BACKGROUND

Printers generally include a print controller that receives raw print data (e.g., Page Description Language (PDL) data), and a print engine. The print controller rasterizes the print job into bitmap data, and the print engine utilizes the bitmap data to mark a printable media, such as paper. Rasterizing raw print data is a time consuming and a computationally intensive process. As such, a rasterizer may not be able to generate raster data fast enough in real time for the print engine during high speed printing. Therefore, modern printing systems may also include one or more hard disk drives, flash drives, or other types of non-volatile storage systems to store bitmap data. Disk(s) or a partition of disk(s) that are used to store bitmap data may also be referred to as a rip spool.

Prior to the print engine marking the media, print data for the job (e.g., PDL data) is rasterized and written to the rip spool. When generating raster data for a job, a rasterizer not only considers the PDL data in the print job, but also the size, type, weight, finish, and other properties of the media that the job is ultimately printed on. This occurs because a number of factors may affect how the same bitmap data "looks" after being printed onto different media. For example, printing the same bitmap data on a glossy finished paper may look different than printing the bitmap data on a plain finished paper. In order to solve this problem, rasterizers analyze various properties of the target media when generating bitmap data in order to tailor the bitmap data to the media. Tailoring the bitmap data to the media may include variations in pel (pixel) size and shape, colorant density, etc. Therefore, a rasterizer uses information about the properties of the target media in order to accurately generate raster data for a job.

In some cases, print jobs may not accurately specify the properties of the target media in sufficient detail to allow the rasterizer to generate the correct bitmap data for the media. For example, a print job may simply reference a printing tray that holds media for the job, such as "tray 1", or "letter". In order to rasterize this job correctly, the rasterizer attempts to identify the characteristics of the media currently loaded in tray 1, or in letter trays at the printer in order to determine the characteristics of the media. The rasterizer then uses the characteristics to tailor the bitmap data for the target media. Problems arise, however, when print jobs are ripped and spooled with some delay before being printed. In this case, the media loaded in the print tray when a job is ripped may be different than the desired media for the job. Also, the media loaded in the print tray may change between the time when the job is ripped and when the job is printed. It thus remains a problem to ensure that raster data for a job is generated correctly that is independent of the media currently loaded at the printer.

SUMMARY

Embodiments described herein provide for the use of virtually stored media "snapshots" for rasterizing print jobs. By using media snapshots, print jobs may be rasterized independently of a media that is currently loaded at the printer. In the embodiments provided, a print controller receives a print job and identifies a virtually stored media that specifies a media property utilized for rasterizing the print job. In the embodiments, the virtually stored media is associated with media tray(s) of the printer. The print controller identifies the media property specified by the virtually stored media, and rasterizes the print job based on the media property specified in the virtually stored media.

One embodiment comprises a system. The system comprises a control system of a print controller and a rasterizer of the print controller. The control system receives a print job, and identifies a virtually stored media that specifies a media property utilized for rasterizing the print job. The virtually stored media is associated with a media tray of a printer. The control system identifies the media property specified by the virtually stored media, and provides the media property to the rasterizer. The rasterizer rasterizes the print job based on the media property specified by the virtually stored media.

Another embodiment comprises a method. According to the method, a print job is received. A virtually stored media is identified that specifies a media property utilized for rasterizing the print job, where the virtually stored media is associated with a print tray of a printer. The media property specified by the virtually stored media is identified, and the print job is rasterized based on the media property specified by the virtually stored media.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
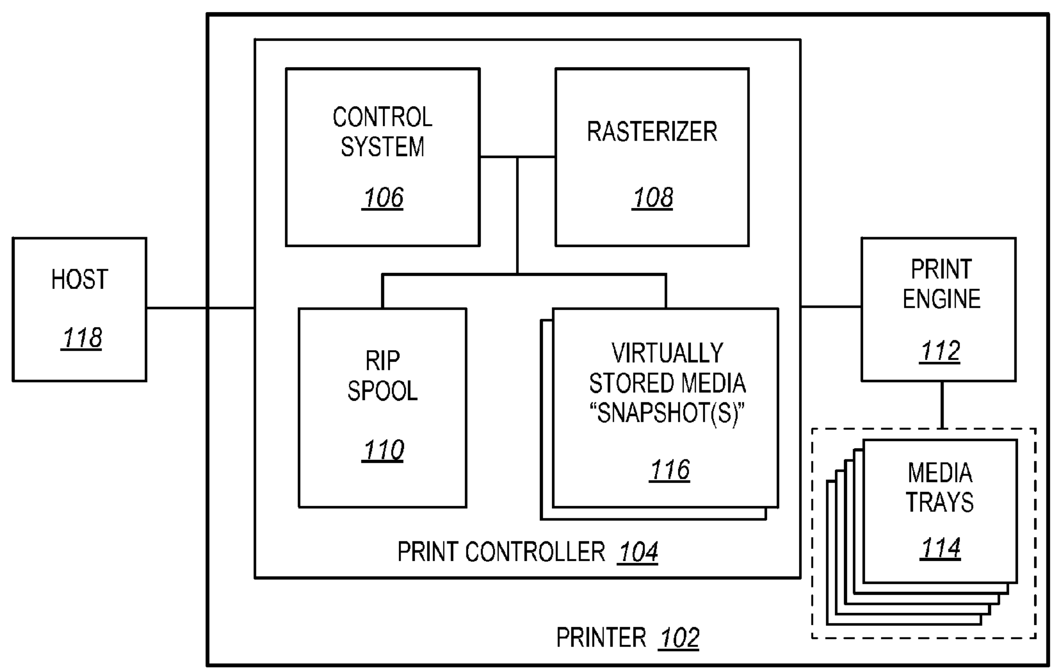
FIG. 1 is a block diagram of a printer in an exemplary embodiment.

FIG. 1 is a block diagram of a printer 102 in an exemplary embodiment. Printer 102 includes a print controller 104, a print engine 112, and one or more media trays 114. In printer 102, controller 104 receives a print job from host 118 for imprinting onto a printable media, such as paper. The print job typically includes raw print data in a page description format such as PDL, Mixed Object: Document Content Architecture (MO:DCA) based on the Advanced Function Presentation (AFP) environment, Printer Control Language (PCL), PostScript data, etc. The print job may also include a job ticket that defines various characteristics of the print job, such as the type of media to use when printing the job (e.g., size, weight, color, etc.), the number of logical pages per sheet side, which media trays at the printer to pull media from when printing the job, etc.

Print controller 104 may perform a number of data processing operations on the print data prior to the media marking step, such as generating raster bitmaps of the logical pages of the print data, assembling sheet side images of the logical page bitmaps, spooling the bitmap data and/or sheet side images to a rip spool 110, etc. Rip spool 110 may be used in cases when the print job is complex and therefore, rasterizer 108 may not be able to generate bitmap data fast enough to keep up with a print speed of print engine 112. Rip spool 110 may also be used to store bitmap data for a print job that may be printed at some later time, such as hours or days later after the bitmap data is spooled. In some cases, a print operator may rasterize and spool bitmap data for the print job prior to the marking step in order to take advantage of periods of low computational activity at print controller 104. At some point, print controller 104 de-spools the previously stored bitmap data from rip spool 110 and provides it to print engine 112. Print engine 112 marks a printable media based on the bitmap data.

In prior printers, if a job ticket for a print job insufficiently specifies a media for the job instead of including a catalog name or some other type of media description information, then a rasterizer may use the wrong media properties when rasterizing the job. For example, if a job ticket simply indicated “letter” as the target media to use when printing the job, then the rasterizing process may incorrectly use the media properties for the letter media currently loaded at the printer when generating bitmap data for the job. This may cause problems when a job is rasterized using the current physical tray configuration and printed at a later time when the tray changes from when the job is rasterized. For example, an operator may generate a print job at host 118, specifying “letter” as the media for the job, instead of a more complete catalog name that clearly defines the properties of the media. The job is transmitted to printer 102 and placed in a job spool. When the job is rasterized, the printer may incorrectly use whatever letter paper is available in the trays to obtain the media properties for generating the raster data. If the job is printed, some properties of the media in the tray may be different than the properties of that were used when the job was rasterized. This may cause printing errors based on the generation of incorrect bitmap sizes for the job, and/or generating incorrect pel attributes for the job, etc.

In this embodiment, print controller 104 solves these problems by utilizing one or more virtually stored media “snapshot(s)” 116 when rasterizing jobs instead of the utilizing the properties of the media loaded into a particular media tray. Snapshot 116 may also be referred to as a media snapshot, and/or a virtually stored media in the following description. Snapshot 116 is one or more stored media states that define the media characteristics of media trays 114 of printer 102 at some particular point in time. For example, a print operator may load one or more media trays 114 of printer 102 with media, and create a snapshot of a media state of printer 102 that defines the characteristics of the media loaded in media trays 114. When a print job is received for a rip operation, the print operator may assign the previously captured snapshot of the media state of the printer to the print job. The snapshot(s) inform the rasterizer about the characteristics of the media to use when rasterizing bitmap data for the job, and allows for a rip process to occur that is independent of the current media loaded into media trays 114. This reduces the possibilities of printing errors due to rasterizing a print job with incorrect media properties. An example of how print controller 104 may operate will be discussed in more detail with regard to the method described in FIG. 2.

Figure 2:
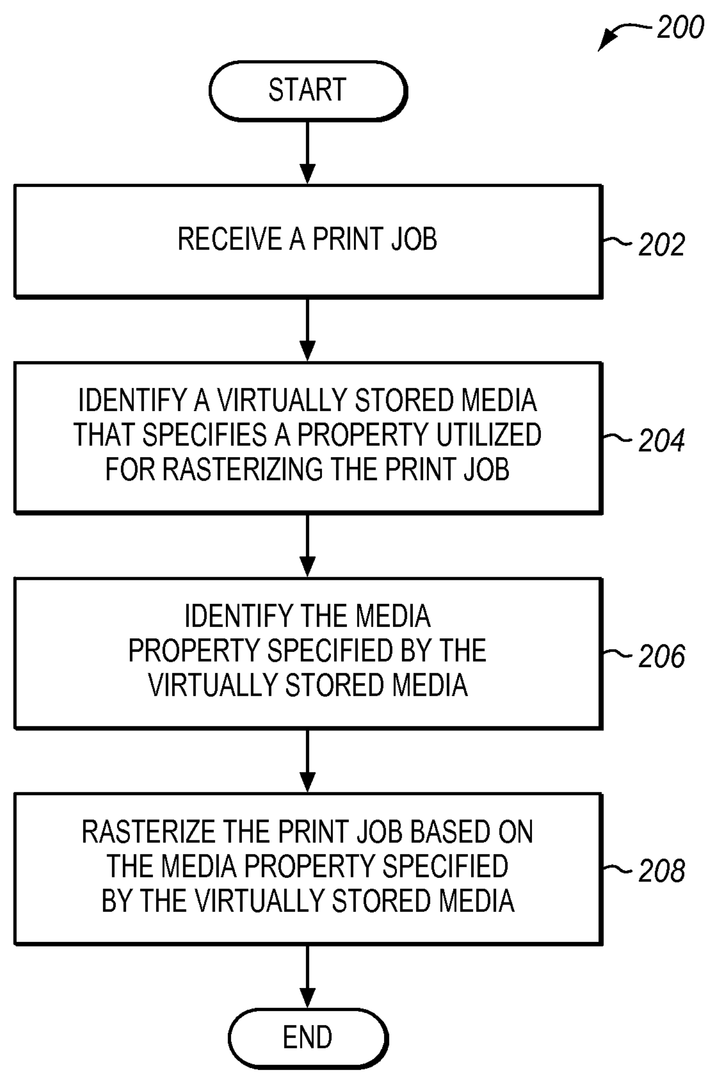
FIG. 2 is flow chart illustrating a method of utilizing virtually stored media "snapshots" for rasterizing print jobs in an exemplary embodiment.

FIG. 2 is flow chart illustrating a method 200 of utilizing media snapshots for rasterizing print jobs in an exemplary embodiment. The steps of method 200 will be described with respect to printer 102 of FIG. 1, although one skilled in the art will understand that method 200 may be performed by other systems not shown. The steps of the methods described herein are not all inclusive and may include other steps not shown. The steps may also be performed in an alternative order.

Assume for this embodiment that control system 106 of print controller 104 (see FIG. 1) receives a print job from host 118 for printing (see step 202 of FIG. 2). In this embodiment, the print job has been associated with a snapshot. Print controller 104 may store a plurality of snapshots 116 that each specify different virtually stored media associated with media trays 114. For example, a print operator may load media trays 114 with media common to a typically run job, and then capture a snapshot of the media trays 114. This snapshot may be assigned at some later time to multiple print jobs that utilize the same media.

In step 204, control system 102 identifies a virtual media snapshot (e.g., snapshot 116) that specifies a media property utilized for rasterizing the print job received in step 202. Snapshots may include various media states of the printer at some previous point in time, such as to how various trays of printer 102 (e.g., media trays 114) are loaded with media when the snapshot was created. Print controller 104 may store any number of snapshots that define previous media states of printer 102 to allow jobs to be readily set up and configured on printer 102. Snapshots may be assigned to print jobs by a print operator, by host 118, etc.

In step 206, control system 106 identifies one or more media properties specified by the virtually stored media. Identifying a media property may include first identifying a virtual tray in the snapshot, etc. For example, the print job may specify “tray 1” for a media tray to use when printing the job, or some other generic descriptor, such as “letter”. In the example, control system 106 may analyze the snapshot to determine what media properties are assigned to virtual tray 1 in the snapshot.

In step 208, rasterizer 108 rasterized the print job based on the media properties identified in step 206 to generate bitmap data. The bitmap data may include logical pages, sheet side images, etc. The bitmap data may then be stored on rip spool 110 prior to printing the job. At some point a print operator may wish to print the spooled job. The print operator may refer to the snapshot to provide instructions that indicate how to load media trays 114 with the correct target media, and then release the job for printing by print engine 112. By using snapshots, print jobs may be rasterized correctly irrespective of the actual media loaded at the printer.

In some embodiments, control system 106 may receive a print job, and determine that the print job does not accurately specify a media property for the job. For example, a job ticket for the print job may specify a tray or some other generic descriptor such as “letter” instead of a particular catalog media for the job. Generally, catalog media specifies the properties of the target media in sufficient detail for generating the correct raster data for the job. In this embodiment, control system 106 would then determine that the print job fails to define a media property that may be necessary to rasterize the job correctly. As discussed previously, rasterizer 108 may utilize various properties of a media to tailor the bitmap data for a particular target media. A general example of a property of the media that may be utilized by rasterizer 108 is the size of the media. In order to correctly generate bitmap data for a particular sized target media, rasterizer 108 may scale the bitmap data based on the size of the target media. Thus, different sized target media may result in different sized raster bitmaps. If control system 106 determines that the print job fails to define a media property such that the job may not be rasterized correctly, then control system 106 may identify a virtually stored media to use when rasterizing the print job. The virtually stored media may be a default snapshot, a snapshot generated at a particular point in time at printer 102, etc.

EXAMPLE

Figure 3:
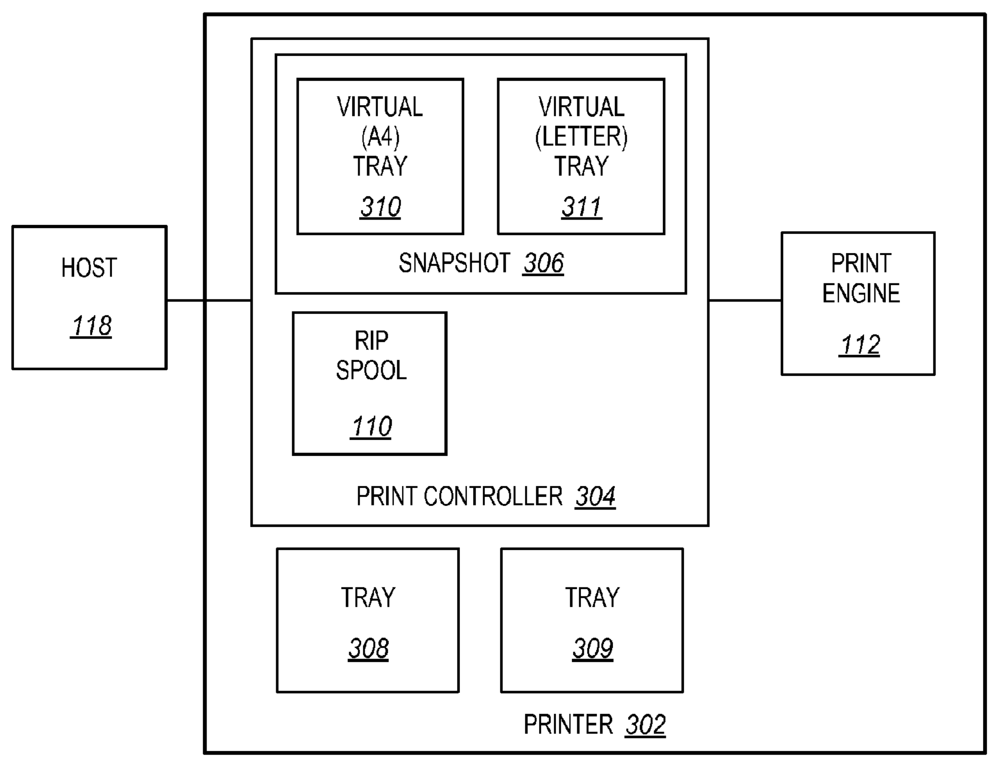
FIG. 3 is a block diagram of a printer in another exemplary embodiment.

FIG. 3 is a block diagram of another printer 302 in another exemplary embodiment. Printer 302 includes a print controller 304, print engine 112, and one or more physical media trays 308-309. Print controller 304 stores a snapshot 306 that is similar to the snapshots/virtually stored media states of the printer of FIG. 1. In printer 302, snapshot 306 includes two virtual trays 310-311. In the example, virtual tray 310 corresponds with a snapshot media state for tray 308, and virtual tray 311 corresponds with a snapshot media state for tray 309. In the example, a print operator generates snapshot 306 by loading A4 media in tray 308 and loading letter media in tray 309. The print operator then generates snapshot 306 of the media state of printer 302 at that time. As a snapshot of a particular media state of printer 302, snapshot 306 indicates A4 in virtual tray 310 that corresponds to physical tray 308. Snapshot 306 also indicates letter media in virtual tray 311 that corresponds to physical tray 309.

When physical trays 308-309 are loaded with A4 and letter, respectively, a print job is generated at host 118 that indicates that part of the job is A4, and part of the job is letter. In the example, a job ticket for this new job indicates generic properties such as "A4" or "letter" in contrast to some named catalog media, or some other type of database reference which may particularly define the properties of the media to use for rasterizing the job. The job is then rasterized. During the rasterization process, the media properties associated with the A4 and the letter trays are used to generate bitmap data for the job.

During a typical printing process, multiple print jobs are received and printed at printer 302. Often, different types of media are used when printing the different jobs. Thus, over time, the physical trays 308-309 at printer 302 may be loaded with a variety of media. In the example, we will consider that tray 309 changes from one type of letter paper to another type of letter paper. For example, the letter paper may change from a matte finish to a glossy finish. Thus, the media in physical tray 309 is different than what is was when the job was rasterized. This will cause problems when the job is printed.

In order to print this job correctly, print controller 304 identifies a snapshot for the job, and processes snapshot 306 to identify virtual trays 310-311 corresponding with a virtual A4 media and a virtual letter media, respectively. Print controller 304 may then rasterize the job using the virtual media properties stored in snapshot 306 instead of referring to trays 308-309 for the media properties. This allows print controller 304 to correctly rasterize the job independently of the current media loaded into media trays 308-309. When a print operator releases the job to print, print controller 304 may analyze snapshot 306 to identify the correct media for the job. Print controller 304 may then instruct the print operator to load the media prior to printing the job. This ensures that the media properties utilized when rasterizing the job match the properties of the media that is used to print the job.

Figure 4:
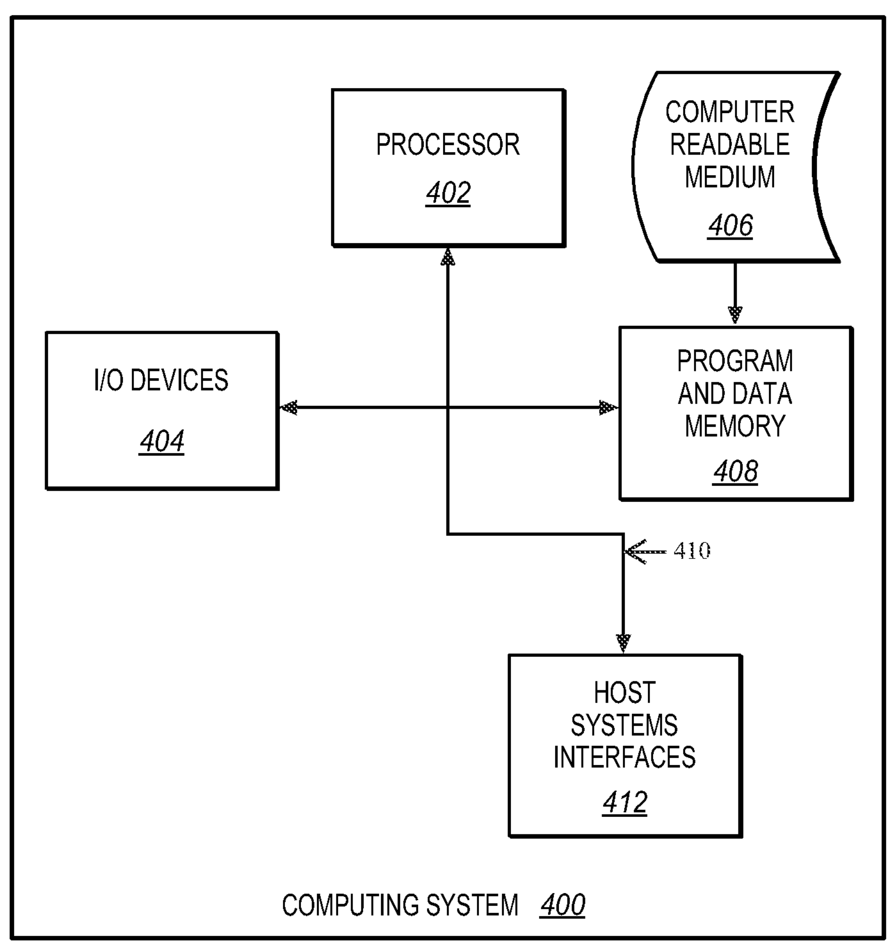
FIG. 4 illustrates a computing system in which a computer readable medium may provide instructions for performing the method of FIG. 2 in an exemplary embodiment.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 4 illustrates a computing system in which a computer readable medium may provide instructions for performing the method of FIG. 2 in an exemplary embodiment.

Furthermore, the invention can take the form of a computer program product accessible from a computer-usable or computer-readable medium 406 providing program code for use by or in connection with a computer or any instruction execution system. For the purposes of this description, a computer-usable or computer readable medium 406 can be any apparatus that can contain, store, communicate, or transport the program for use by or in connection with the instruction execution system, apparatus, or device.

The medium 406 can be an electronic, magnetic, optical, electromagnetic, infrared, or semiconductor system (or apparatus or device) or a propagation medium. Examples of a computer-readable medium 406 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include one or more processors 402 coupled directly or indirectly to memory 408 through a system bus 410. The memory 408 can include local memory employed during actual execution of the program code, bulk storage, and cache memories which provide temporary storage of at least some program code in order to reduce the number of times code is retrieved from bulk storage during execution.

Input/output or I/O devices 404 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 412, or remote printers or storage devices through intervening private or public networks. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

We claim:

1. A system comprising:

a control system of a print controller that is operable to receive a print job, to determine if the print job includes a media identifier that fails to specify a media property of a media, wherein the media property is utilized for rasterizing the print job, and to identify a virtually stored media that specifies the media property in response to determining that the media identifier fails to specify the media property, wherein the virtually stored media is associated with a media tray of a printer;

the control system further operable to identify the media property specified by the virtually stored media; and a rasterizer of the print controller that is operable to receive the media property specified by the virtually stored media from the control system, and to rasterize the print job based on the media property specified by the virtually stored media.

2. The system of claim 1 wherein:

the media identifier generically indicates a media loaded in a tray of the printer.

3. The system of claim 1 wherein:

the control system is further operable to assign a first virtually stored media to a first print job received by the printer, and to assign a second virtually stored media to a second print job received by the printer, wherein the first virtually stored media and the second virtually stored media specify different media properties.

4. The system of claim 1 wherein:

the virtually stored media specifies a media associated with each media tray at the printer.

5. The system of claim 1 wherein:

the virtually stored media specifies at least one of a paper size, a paper weight, and a paper finish for a media associated with the print job.

6. A method comprising:

receiving a print job;

determining if the print job includes a media identifier that fails to specify a media property of a media, wherein the media property is utilized for rasterizing the print job;

identifying a virtually stored media that specifies the media property in response to determining that the media identifier fails to specify the media property, wherein the virtually stored media is associated with a media tray of a printer;

identifying the media property specified by the virtually stored media; and rasterizing the print job based on the media property specified by the virtually stored media.

7. The method of claim 6 wherein:

the media identifier generically indicates a media loaded in a tray of the printer.

8. The method of claim 6 further comprising:

assigning a first virtually stored media to a first print job received by the printer; and assigning a second virtually stored media to a second print job received by the printer, wherein the first virtually stored media and the second virtually stored media specify different media properties.

9. The method of claim 6 wherein:

the virtually stored media specifies a media associated with each media tray at the printer.

10. The method of claim 6 wherein:

the virtually stored media specifies at least one of a paper size, a paper weight, and a paper finish for a media associated with the print job.

11. A non-transitory computer readable medium embodying programmed instruction which, when executed by a processor, are operable for performing a method, the method comprising:

receiving a print job;

determining if the print job includes a media identifier that fails to specify a media property of a media, wherein the media property is utilized for rasterizing the print job;

identifying a virtually stored media that specifies the media property in response to determining that the media identifier fails to specify the media property, wherein the virtually stored media is associated with a media tray of a printer;

identifying the media property specified by the virtually stored media; and rasterizing the print job based on the media property specified by the virtually stored media.

12. The non-transitory medium of claim 11 wherein:

the media identifier generically indicates a media loaded in a tray of the printer.

13. The non-transitory medium of claim 11, wherein the method further comprises:

assigning a first virtually stored media to a first print job received by the printer; and assigning a second virtually stored media to a second print job received by the printer, wherein the first virtually stored media and the second virtually stored media specify different media properties.

14. The non-transitory medium of claim 11 wherein:

the virtually stored media specifies a media associated with each media tray at the printer.

15. The non-transitory medium of claim 11 wherein:

the virtually stored media specifies at least one of a paper size, a paper weight, and a paper finish for a media associated with the print job.

* * * * *